United States Patent
Takahashi et al.

(10) Patent No.: US 7,515,300 B2
(45) Date of Patent: Apr. 7, 2009

(54) IMAGE PROCESSING APPARATUS AND IMAGE PROCESSING METHOD

(75) Inventors: Kosei Takahashi, Tokyo (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 10/897,547

(22) Filed: Jul. 22, 2004

(65) Prior Publication Data
US 2005/0024656 A1     Feb. 3, 2005

(30) Foreign Application Priority Data
Jul. 30, 2003    (JP)    ............. 2003-282855

(51) Int. Cl.
*G06F 15/00* (2006.01)
*G06K 15/00* (2006.01)
*G06K 9/00* (2006.01)

(52) U.S. Cl. .......... 358/1.9; 358/3.23; 358/523; 382/162

(58) Field of Classification Search ......... 358/1.9, 358/515, 518, 523, 525, 3, 23; 382/162, 382/167, 163, 164
See application file for complete search history.

(56) References Cited

U.S. PATENT DOCUMENTS

| | | | |
|---|---|---|---|
| 6,058,207 A * | 5/2000 | Tuijn et al. | 382/162 |
| 6,215,561 B1 * | 4/2001 | Kakutani | 358/1.9 |
| 6,292,195 B1 * | 9/2001 | Shimizu et al. | 345/604 |
| 6,633,667 B1 | 10/2003 | Matsuoka | |
| 2003/0002061 A1 * | 1/2003 | Van de Capelle | 358/1.9 |
| 2005/0237553 A1 * | 10/2005 | Takahashi et al. | 358/1.9 |

FOREIGN PATENT DOCUMENTS

| JP | 11-163543 A | 11/1994 |
|---|---|---|
| JP | 2001-136401 A | 5/2001 |

* cited by examiner

*Primary Examiner*—Madeleine A Nguyen
(74) *Attorney, Agent, or Firm*—Canon U.S.A. Inc., I.P. Division

(57) ABSTRACT

An image processing method creates a lookup table having a plurality of grids. The image processing method includes the steps of selecting a grid having a small difference from a target grid from among grids whose output values are calculated; setting an output value of the selected grid as an initial value; optimizing an output value of the target grid by using the set initial value; and storing the optimized output value as an output value of the target grid.

5 Claims, 16 Drawing Sheets

FIG. 5

| | C AMOUNT OF JETTED INK | M AMOUNT OF JETTED INK | Y AMOUNT OF JETTED INK | K AMOUNT OF JETTED INK | O AMOUNT OF JETTED INK | G AMOUNT OF JETTED INK |
|---|---|---|---|---|---|---|
| OPTIMAL AMOUNT OF JETTED INK | C | M | Y | K | O | G |
| AMOUNT OF JETTED INK OF NEIGHBORHOOD POINTS | C + Δ | M | Y | K | O | G |
| | C - Δ | M | Y | K | O | G |
| | C | M + Δ | Y | K | O | G |
| | C | M - Δ | Y | K | O | G |
| | C | M | Y + Δ | K | O | G |
| | C | M | Y - Δ | K | O | G |
| | C | M | Y | K + Δ | O | G |
| | C | M | Y | K - Δ | O | G |
| | C | M | Y | K | O + Δ | G |
| | C | M | Y | K | O - Δ | G |
| | C | M | Y | K | O | G + Δ |
| | C | M | Y | K | O | G - Δ |

IMAGE PROCESSING APPARATUS AND IMAGE PROCESSING METHOD

This application claims priority from Japanese Patent Application No. 2003-282855 filed Jul. 30, 2003, which is hereby incorporated by reference.

BACKGROUND OF THE INVENTION

1. Field of the Invention

The present invention relates to an image processing apparatus and an image processing method. More specifically, the present invention relates to, for example, a color separation technology for use in printing with special-color ink.

2. Description of the Related Art

In order to print images with an outputting device including a printer, color separation is required to convert RGB image data into CMYK (cyan, magenta, yellow, and black) data representing an amount of jetted ink used in the printer. A color separation method typically uses a table, that is, a lookup table (LUT), in which input RGB values have a one-to-one correspondence with output CMYK values.

In addition, when a large number of identical images are printed in offset printing or the like, special-color printing with ink having five colors or more including at least one special color in addition to CMYK colors is adopted in order to accurately reproduce brighter colors in an original image.

Generally, the number of patches necessary for creating an LUT is represented by the following equation.

[Formula 1]
$$P = n^m \quad (1)$$

where n denotes the number of grids of one-color ink and m denotes the number of kinds of ink.

When four-color ink is used and the number of grids is eight, $8^4 = 4096$ patches are required. In contrast, when special colors are added to increase the number of kinds of ink (for example, six-color ink having CMYK colors, orange (O), and green (G) is used), the number of patches necessary to create an LUT is increased to $8^6 = 262,144$, thus requiring an enormous cost for output and color measurement.

Inversely, when the six-color ink is used to create an LUT including 4,096 sample patches, as in the case where the four-color ink is used and the number of grids is eight, four grids are used for each color in the LUT, thus reducing the accuracy of color reproduction.

One color separation method for special-color printing with ink having five or more colors is disclosed in Japanese Unexamined Patent Application Publication No. 2001-136401. In this method, an LUT is divided for every hue and a plurality of LUTs having a total of four colors is prepared to switch the LUTs for every input data, instead of allowing for all combinations of the used ink. Each LUT has two arbitrary colors having adjacent hues, a special color sandwiched therebetween, and black (K).

In addition, another color separation method is disclosed in Japanese Unexamined Patent Application Publication No. 06-326861. In this method, color reproduction prediction is performed by using a printer model and input RGB values and output CMYK values are converted into Lab values in a color space independent of a device, such as a CIE Lab uniform color space, to determine color separation values so as to make smaller differences between the Lab values converted from the input RGB values and those converted from the output CMYK values.

However, in the technology disclosed in Japanese Unexamined Patent Application Publication No. 2001-136401, since an LUT is created for every hue and the LUTs are switched for every Lab value of the input data, there is a problem in that only up to four-color ink is used for one input value, despite of using the ink having five or more colors.

In the technology disclosed in Japanese Unexamined Patent Application Publication No. 06-326861, a printer model is used to perform color reproduction prediction for color separation. Since the color separation is performed for every pixel without allowing for image information, that is, the relationship between the value of a target pixel and the values of neighborhood pixels, there is a problem in that, when the differences among the color separation results of pixels having approximate RGB values are widened due to the errors of the color reproduction prediction, areas where the values smoothly vary in the input image are reproduced in significantly different colors in the output image, causing noise or pseudo outlines.

SUMMARY OF THE INVENTION

In order to solve the problems described above individually or collectively, it is an object of the present invention to eliminate the need for using multiple patches to create an LUT for color separation even when the number of colors of ink used for printing is increased.

It is another object of the present invention to provide an output image with a higher quality having inhibited noise or pseudo outlines with ink having five or more colors, without using an LUT for color separation created by using multiple patches.

The present invention provides, in its first aspect, an image processing method of creating a lookup table having a plurality of grids. The image processing method includes the steps of selecting a grid having a small difference from a target grid from among grids whose output values are calculated; setting an output value of the selected grid as an initial value; optimizing an output value of the target grid by using the set initial value; and storing the optimized output value as an output value of the target grid.

The present invention provides, in its second aspect, an image processing method including the steps of inputting an image; retrieving a pixel having the smallest color difference from a target pixel in the image from a memory that stores the values of pixels that have undergone color separation and an amount of jetted ink; setting the amount of jetted ink of the retrieved pixel as an amount of jetted ink of the target pixel; estimating a reproduction color in the amount of jetted ink set for the target pixel and a reproduction color in an amount of jetted ink in the neighborhood of the amount of jetted ink; determining an amount of jetted ink providing a smallest color reproduction difference of the target pixel based on the estimated reproduction color; and storing the value of the target pixel and the determined amount of jetted ink in the memory.

The present invention provides, in its third aspect, an image processing method of creating a lookup table having a plurality of grids. The image processing method includes the steps of setting an output value of a target grid; estimating a reproduction color in the output value set for the target grid; calculating a color reproduction difference of the target grid based on the estimated reproduction color; calculating an output value error based on a color difference between the target grid and a grid in a reference area in the neighborhood of the target grid and on a difference between the output value of the target grid and the output value of the grid in the reference area; and determining an output value of the target grid based on the color reproduction difference and the output value error.

The present invention provides, in its fourth aspect, an image processing apparatus for creating a lookup table having a plurality of grids. The image processing apparatus includes a selecting unit for selecting a grid having a small difference from a target grid from among grids whose output values are calculated; a setting unit for setting an output value of the selected grid as an initial value; an optimizing unit for optimizing an output value of the target grid by using the set initial value; and a storing unit for storing the optimized output value as an output value of the target grid.

The present invention provides, in its fifth aspect, an image processing apparatus including an inputting unit for inputting an image; a retrieving unit for retrieving a pixel having the smallest color difference from a target pixel in the image from a memory that stores the values of pixels that have undergone color separation and an amount of jetted ink; a setting unit for setting the amount of jetted ink of the retrieved pixel as an amount of jetted ink of the target pixel; an estimating unit for estimating a reproduction color in the amount of jetted ink set for the target pixel and a reproduction color in an amount of jetted ink in the neighborhood of the amount of jetted ink; a determining unit for determining an amount of jetted ink providing a smallest color reproduction difference of the target pixel based on the estimated reproduction color; and a storing unit for storing the value of the target pixel and the determined amount of jetted ink in the memory.

The present invention provides, in its sixth aspect, an image processing apparatus for creating a lookup table having a plurality of grids. The image processing apparatus includes a setting unit for setting an output value of a target grid; an estimating unit for estimating a reproduction color in the output value set for the target grid; a calculating unit for calculating a color reproduction difference of the target grid based on the estimated reproduction color; a calculating unit for calculating an output value error based on a color difference between the target grid and a grid in a reference area in the neighborhood of the target grid and on a difference between the output value of the target grid and the output value of the grid in the reference area; and a determining unit for determining an output value of the target grid based on the color reproduction difference and the output value error.

Further objects, features, and advantages of the present invention will become apparent from the following description of the preferred embodiments with reference to the attached drawings.

BRIEF DESCRIPTION OF THE DRAWINGS

FIG. 5 is a table illustrating 12 neighborhood points used for determining the optimal amount of jetted ink.

DESCRIPTION OF THE PREFERRED EMBODIMENTS

Image processing according to embodiments of the present invention will be described in detail below with reference to the attached drawings.

First Embodiment

Structure

Figure 1:
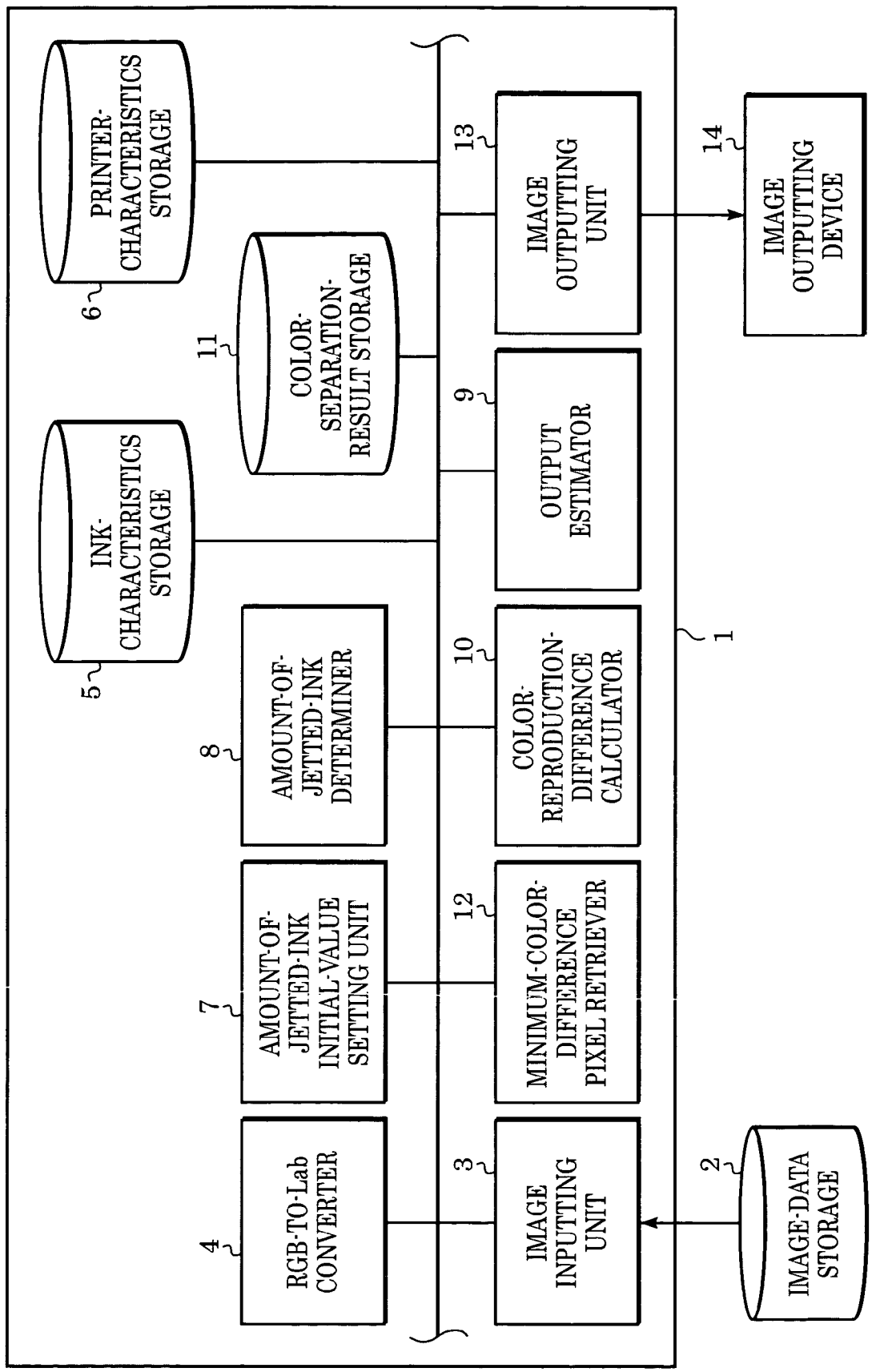
FIG. 1 is a block diagram showing a structure example of a color separation device according to a first embodiment of the present invention.

FIG. 1 is a block diagram showing a structure example of a color separation device 1 according to a first embodiment of the present invention.

An image-data storage 2 stores RGB image data before color separation. An image inputting unit 3 reads the image data stored in the image-data storage 2. An RGB-to-Lab converter 4 converts the RGB value of each pixel in the input image data into a Lab value by using, for example, an ICC profile.

An ink-characteristics storage 5 stores ink characteristics (spectral reflectances or tristimulus values) in solid printing (having an area ratio of 100%) with ink for output (hereinafter referred to as output ink). A printer-characteristics storage 6 stores monochrome and mixed-color dot gains when an image is printed by a printer with the output ink.

An amount-of-jetted ink initial-value setting unit 7 sets an initial value of the amount of jetted ink of each pixel in the input image data. An amount-of-jetted ink determiner 8 determines an optimal amount of jetted ink of each pixel in the input image data.

An output estimator 9 estimates a reproduction color of the image output from an output device by using the ink characteristics stored in the ink-characteristics storage 5, the printer characteristics (dot gains) stored in the printer-characteristics storage 6, and the amount of jetted ink determined by the amount-of-jetted ink determiner 8. In other words, the output estimator 9 estimates an output image (printout). A color-reproduction-difference calculator 10 calculates a color reproduction difference from the output image estimated as the image that the input image data represents.

A color-separation-result storage 11 stores a color separation result. A minimum-color-difference pixel retriever 12 retrieves a pixel having a minimum color difference from a target pixel from among pixels that have undergone color separation. An image outputting unit 13 outputs the image data to an image outputting device 14, which is the output device of a printer or the like, based on the color separation result stored in the color-separation-result storage 11.

Processing

Figure 2:
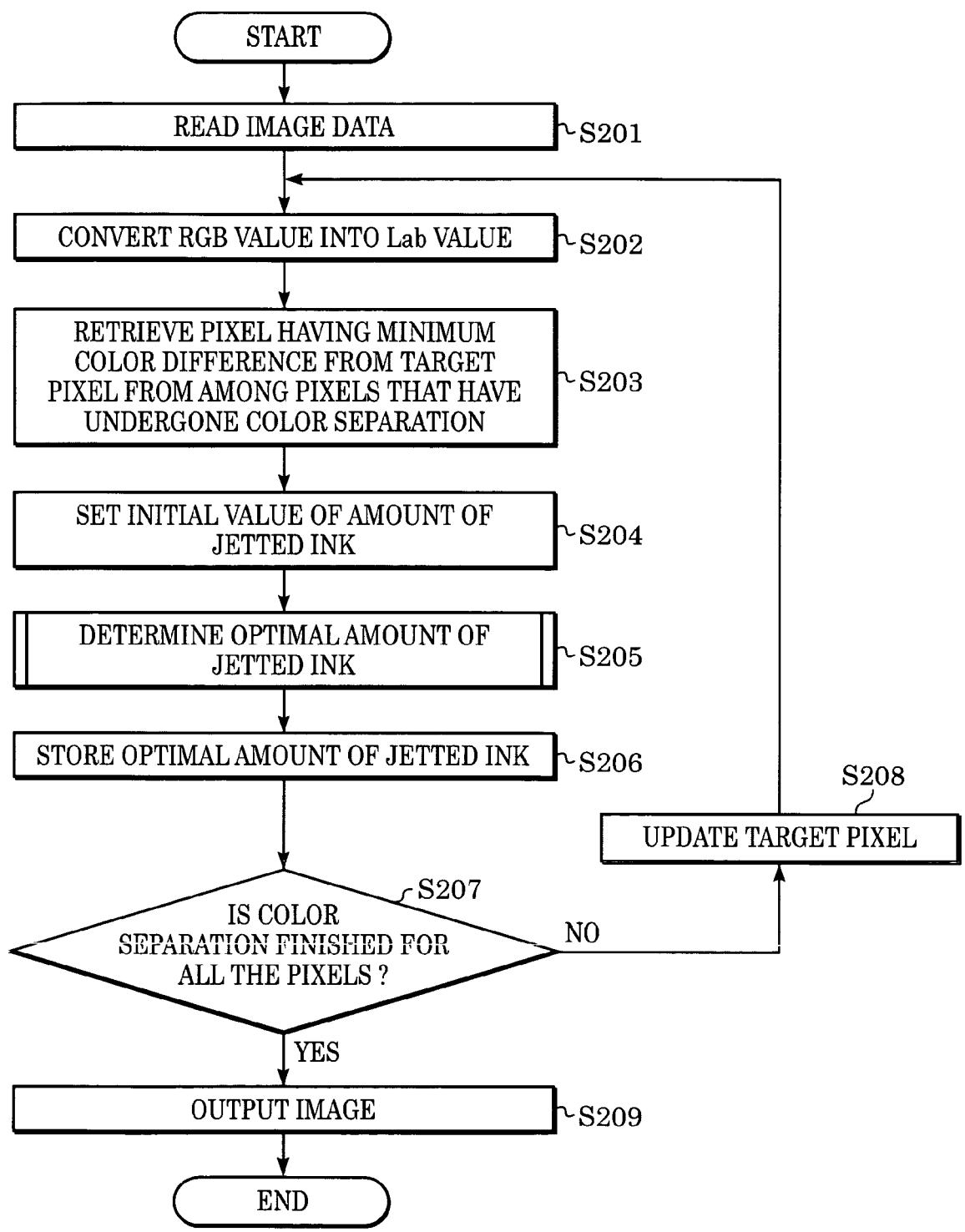
FIG. 2 is a flowchart illustrating the image processing in the color separation device of the first embodiment.

FIG. 2 is a flowchart illustrating the image processing in the color separation device 1 of the first embodiment.

In Step S201, the image inputting unit 3 reads RGB image data stored in the image-data storage 2. In Step S202, the RGB-to-Lab converter 4 converts the RGB value of a target pixel in the input image data into a Lab value by using, for example, an ICC profile. However, a color reproduction range (color gamut) of a display, which is represented as a RGB value, generally differs from a color gamut that can be represented by a printer. If the Lab value converted from the input RGB value is outside the color gamut of the printer, color-gamut compression is required to compress the pixel value into a value within the color gamut of the printer. The color-gamut compression method used here is not particularly limited as long as it provides a desired result of the color-gamut compression.

In Step S203, the minimum-color-difference pixel retriever 12 retrieves a pixel having a minimum color difference from a target pixel from among pixels that have undergone color separation. In Step S204, the amount-of-jetted ink initial-value setting unit 7 sets an initial value of the amount of jetted ink of the target pixel based on the amount of jetted ink of the retrieved pixel. In Step S205, the amount-of-jetted ink determiner 8 determines an optimal amount of jetted ink, as is described in more detail below. In Step S206, the color-separation-result storage 11 stores the Lab value of the target pixel and the determined optimal amount of jetted ink.

In Step S207, the color separation device 1 determines whether the color separation is finished for all the pixels in the input image data. If the color separation is finished for all the pixels, in Step S209, the image outputting unit 13 outputs the image data of the color separation result stored in the color-separation-result storage 11 to the image outputting device 14 to form an image. If the color separation is not finished for all the pixels, the color separation device 1 updates the target pixel in Step S208 and returns the processing to Step S202.

Setting Initial Value of Amount of Jetted ink

The step of setting an initial value of the amount of jetted ink (S204) will now be described in detail.

Generally, since an amount of jetted ink has a nonlinear relationship with a reproduction color obtained by color mixture of ink when the color reproduction is performed with a printer, optimization of the amount of jetted ink is required to determine an optimal amount of jetted ink. However, a color reproduction difference nonlinearly varies with the amount of jetted ink varied. As a result, a local minimum value is provided, instead of a true minimum value, in common optimization processing.

Figure 3A:
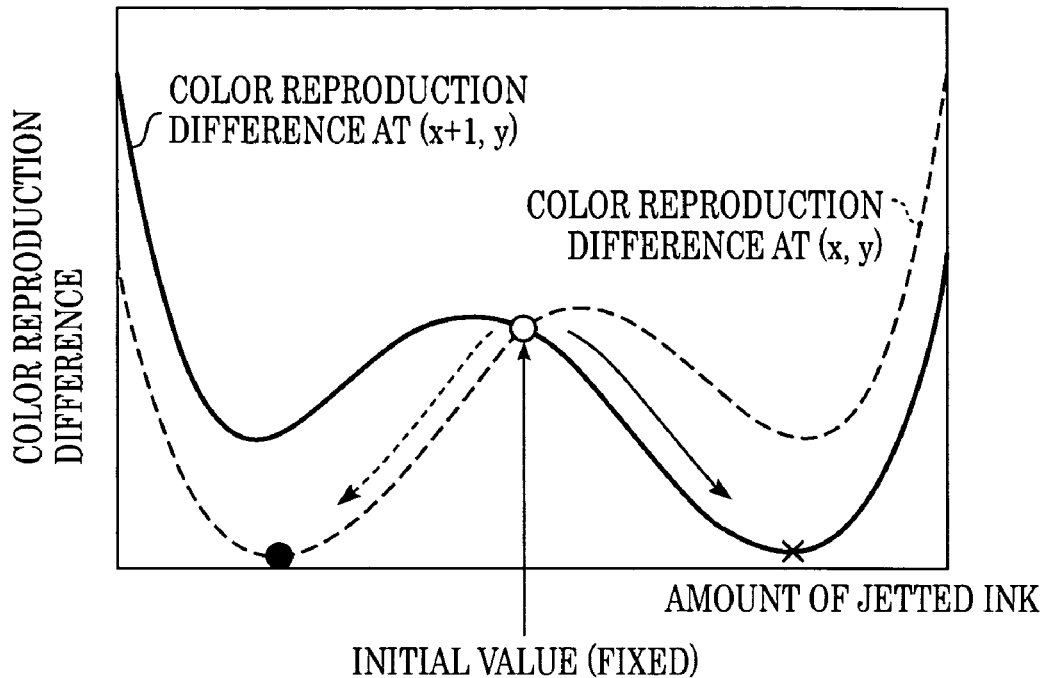
FIG. 3A is a graph illustrating a step of setting an initial value of an amount of jetted ink.
Figure 3B:
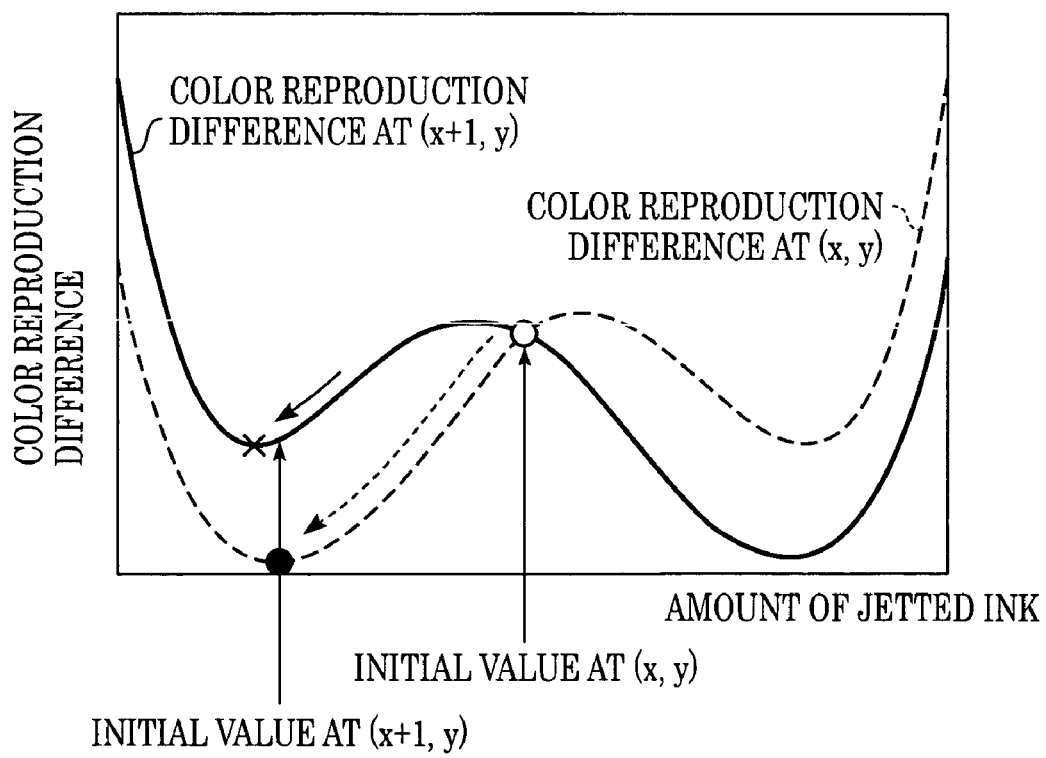
FIG. 3B is another graph illustrating the step of setting an initial value of an amount of jetted ink.

For example, as shown in FIG. 3A, when a pixel (x, Y) has an RGB value close to that of an adjacent pixel (X+1, y) in an image, each pixel exhibits the similar relationship between the amount of jetted ink and the color reproduction difference. However, since the relationship is not completely the same, the local minimum value of one pixel may greatly differ from that of the other pixel even if both the pixels have the same initial value. Accordingly, instead of optimizing the amount of jetted ink with the initial value fixed, using as the initial value the amount of jetted ink of a pixel having the smallest color difference from a target pixel among the pixels that have already undergone the color separation (reference pixels) produces the optimization result of an approximate amount of jetted ink, as shown in FIG. 3B. The optimization of the amount of jetted ink will be described in detail in "Determining Optimal Amount of Jetted ink" described below.

Determining all the color differences of the input pixel from the pixels that have already undergone the color reproduction requires a large amount of processing time and memory. Accordingly, it is sufficient to use the Lab values and the color separation results of only a predetermined number of pixels and to sequentially update the reference pixels as the processing progresses. However, since there is no pixel that has undergone color separation for the pixel that is processed first in the input image, an arbitrary amount of jetted ink (for example, 0% or 50%) is used as the initial value.

Determining Optimal Amount of Jetted ink

Figure 4:
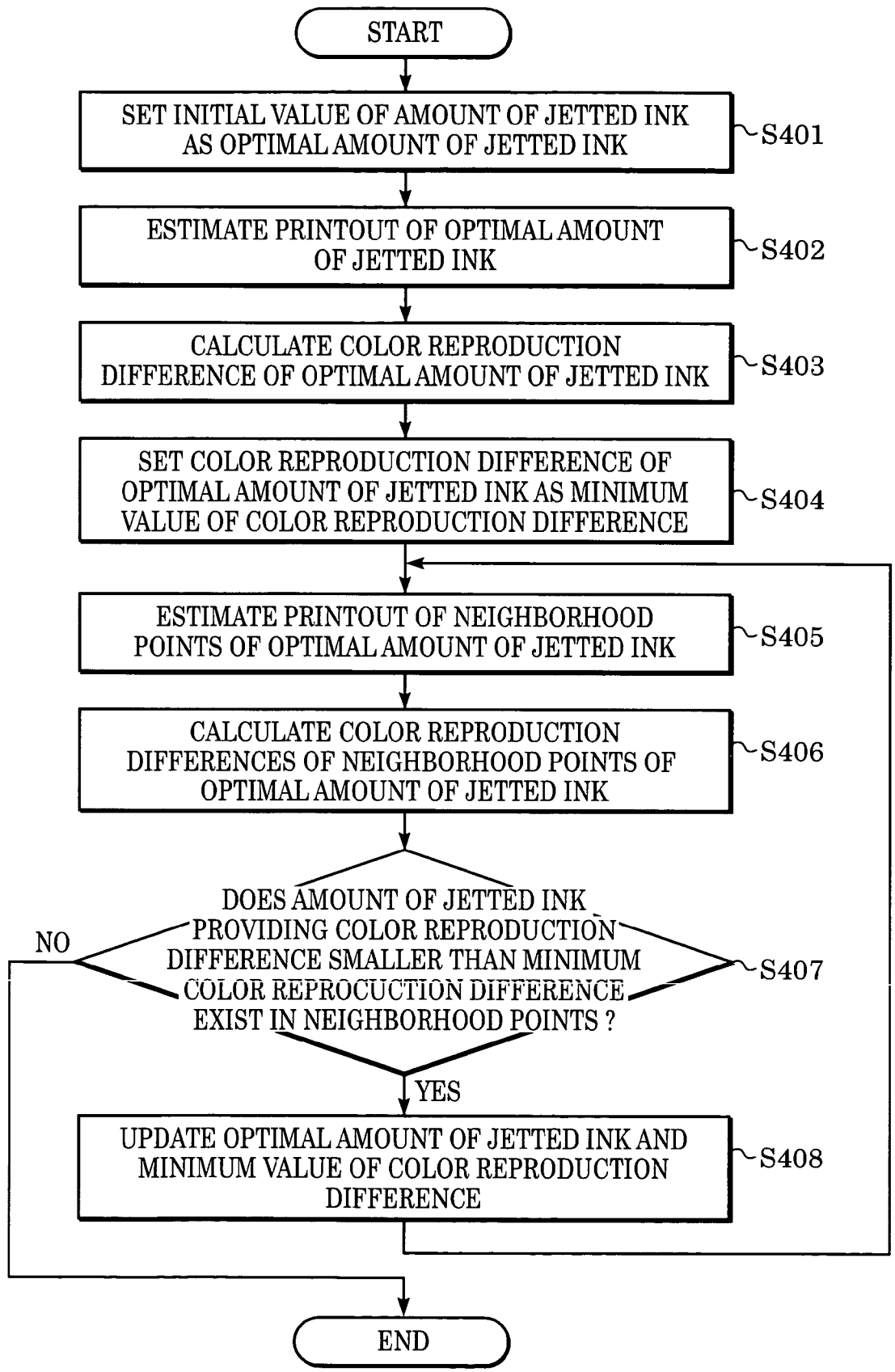
FIG. 4 is a flowchart showing a step of determining an optimal amount of jetted ink.

FIG. 4 is a flowchart showing the step of determining an optimal amount of jetted ink (Step S205).

In Step S401, the color separation device 1 sets the initial value of the amount of jetted ink set by the amount-of-jetted ink initial-value setting unit 7 in Step S204 as an optimal amount of jetted ink. In Step S402, the output estimator 9 estimates a printout, as is described in more detail below. In Step S403, the color-reproduction-difference calculator 10 calculates the color difference between the Lab value of a target pixel and the Lab value of the estimated printout to provide a color reproduction difference.

In Step S404, the step sets the calculated color reproduction difference as the minimum value of the color reproduction difference. In Step S405, the amount-of-jetted ink determiner 8 sets the amount of jetted ink of neighborhood points of the optimal amount of jetted ink set in Step S401 (for example, when six-color ink including cyan C, magenta M, yellow Y, black K, orange O, and green G is used, 12 values obtained by varying the amount of jetted ink for each color ink by ±Δ, as shown in FIG. 5), and the output estimator 9 estimates the printouts for the amount of jetted ink of the 12 neighborhood points.

In Step S406, the color-reproduction-difference calculator 10 calculates color reproduction differences of the printouts estimated in Step S405. In Step S407, the color separation device 1 determines whether an amount of jetted ink providing a color reproduction difference smaller than the minimum color reproduction difference exists in the 12 neighborhood points. If the amount of jetted ink providing such a color reproduction difference exists, in Step S408, the color separation device 1 updates the optimal amount of jetted ink with the amount of jetted ink providing the minimum color reproduction difference, and updates the minimum value of the color reproduction difference with the determined color reproduction difference. The color separation device 1 then returns to Step S405. If the amount of jetted ink providing a color reproduction difference smaller than the minimum color reproduction difference does not exist in Step S407, the color separation device 1 terminates the processing.

Estimating Printout

The estimation of a printout in Steps S402 and S405 will now be described in detail.

The output estimator 9 estimates the printout by using the ink characteristics stored in the ink-characteristics storage 5 and the printer characteristics stored in the printer-characteristics storage 6. The ink characteristics and the printer characteristics are calculated by actually outputting sample patches with the image outputting device 14 and measuring the colors of the patches.

Figure 6A:
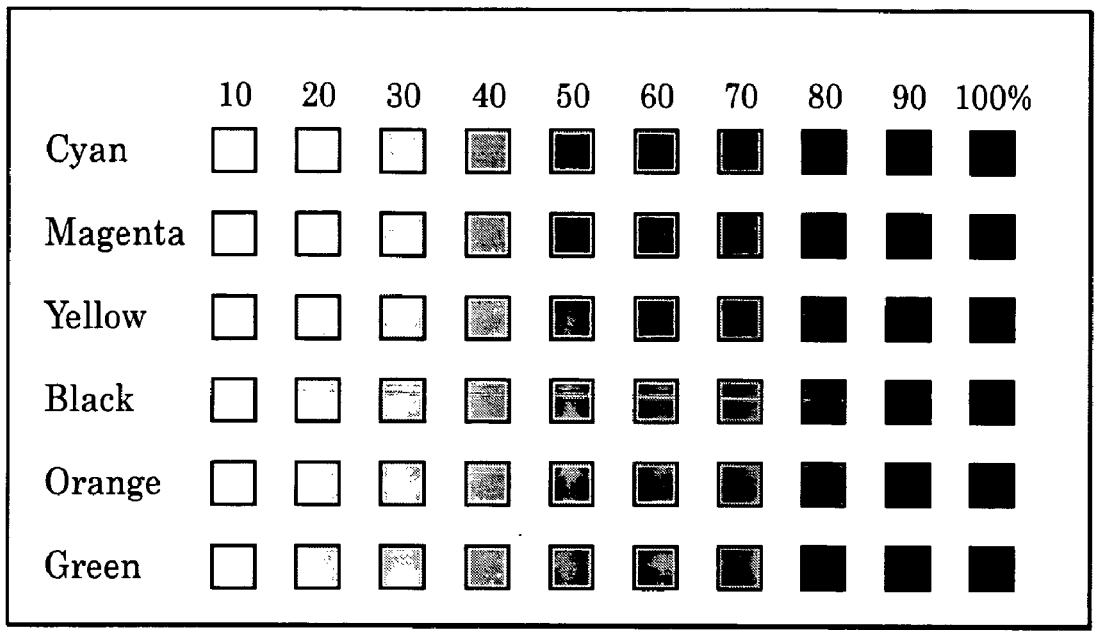
FIG. 6A is a diagram illustrating patches for measuring ink characteristics.
Figure 6B:
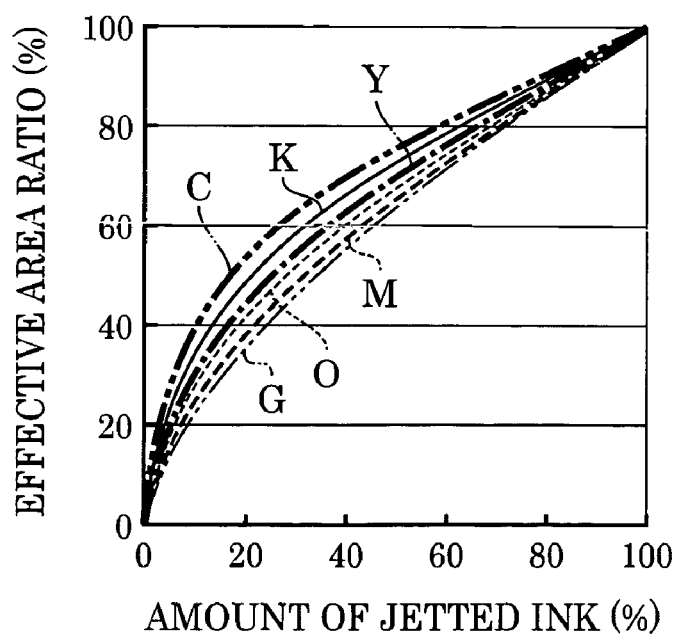
FIG. 6B is a graph illustrating the ink characteristics.
Figure 7:
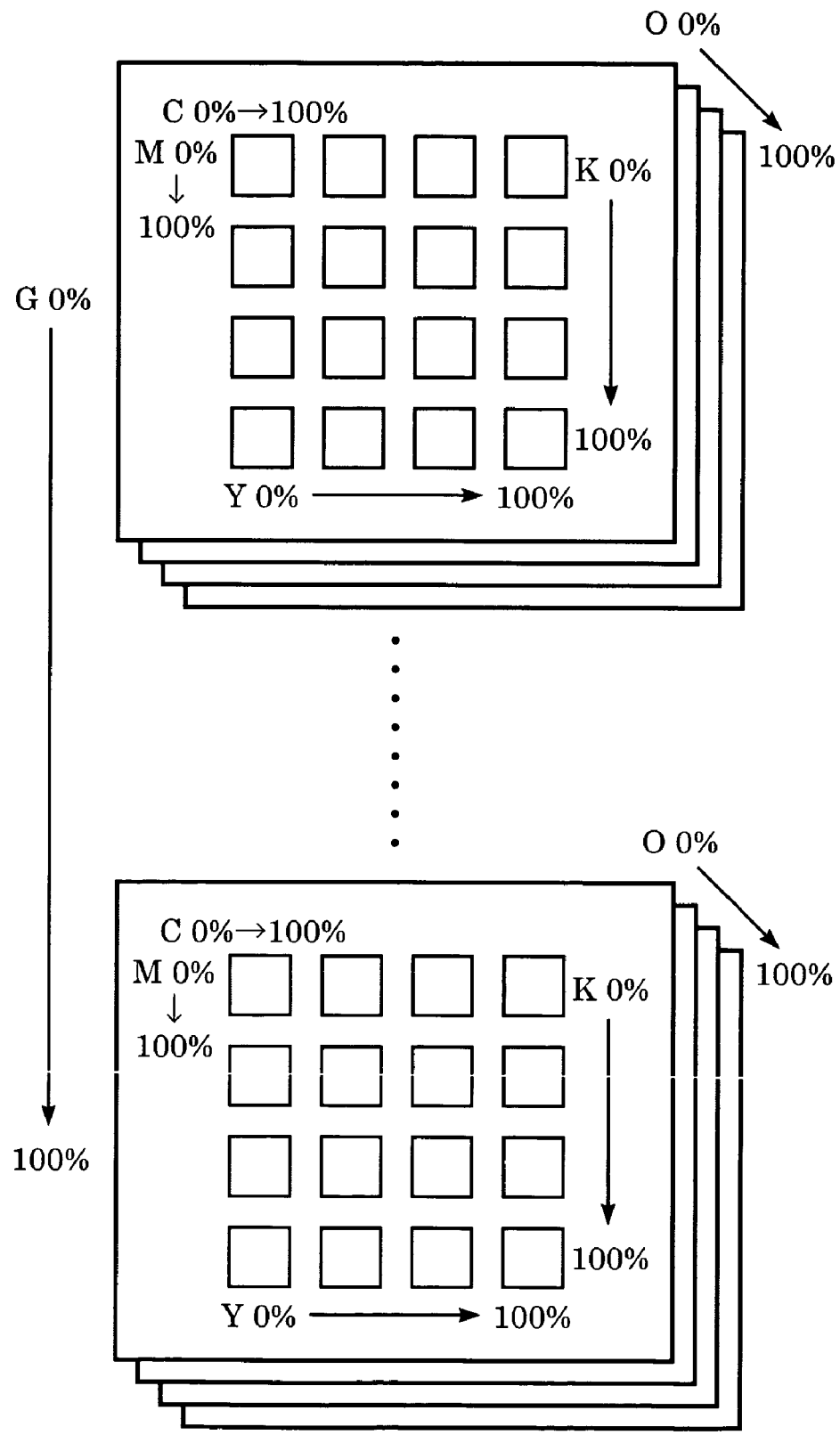
FIG. 7 is a diagram illustrating mixed-color patches for measuring printer characteristics.

Specifically, the ink characteristics representing the relationship between the amount of jetted ink and the effective area ratio of monochrome gradation, as shown in FIG. 6B, are calculated by outputting the gradation patches for each color ink, as shown in FIG. 6A, and measuring the colors of the gradation patches. In addition, the effective area ratio of monochrome ink and the printer characteristics (lookup table (LUT)) representing color mixture results are obtained by outputting mixed-color patches in which the effective area ratio of each color ink is varied at equal intervals, as shown in FIG. 7, and measuring the colors of the mixed-color patches. Performing interpolation, such as tetrahedral interpolation, for the sample points of the printer characteristics can calculate the output value in an arbitrary amount of jetted ink.

Generally, when gradation patches in which the values of the amount of jetted ink are varied at predetermined intervals are created, the effective area ratio greatly varies in areas having smaller values of the amount of jetted ink whereas the effective area ratio slowly varies in areas having larger values of the amount of jetted ink owing to a phenomenon called a dot gain, as shown in FIG. 6B. Accordingly, varying the values of the amount of jetted ink at predetermined intervals in the creation of the gradation patches for measuring color mixing characteristics produces a biased LUT in which the output values greatly vary in areas having smaller values of the amount of jetted ink and the output values slightly vary in areas having larger values of the amount of jetted ink. Consequently, it is preferable that the monochromatic gradation vary at equal intervals. In other words, it is preferable that the gradation patches for measuring color mixing characteristics be created such that the effective area ratios vary at equal intervals.

The estimation of the printout is not limited to interpolation calculation of the LUT. Color reproduction may be predicted by using, for example, a Neugebauer equation.

As described above, according to the first embodiment, in order to determine the amount of jetted ink of a pixel, a pixel having the smallest color difference is retrieved from among the pixels that have undergone color separation (reference pixels), and a color reproduction difference is calculated using the amount of jetted ink of the retrieved pixel as the initial value. An amount of jetted ink having the smallest color reproduction difference is determined by comparing the calculated color reproduction difference with the color reproduction differences for the amount of jetted ink of the neighborhood points. Accordingly, even without outputting a large number of sample patches and measuring the colors of the sample patches to create printer characteristics (LUT), color separation results having inhibited noise or pseudo outlines can be attained for printing with ink having five colors or more including at least one special color in addition to CMYK colors. Hence, it is possible to provide output images with a high quality.

Second Embodiment

Image processing according to a second embodiment of the present invention will now be described. The same reference numerals are used in the second embodiment to identify substantially the same components as in the first embodiment. Detailed description of such components is omitted here.

Structure

Figure 8:
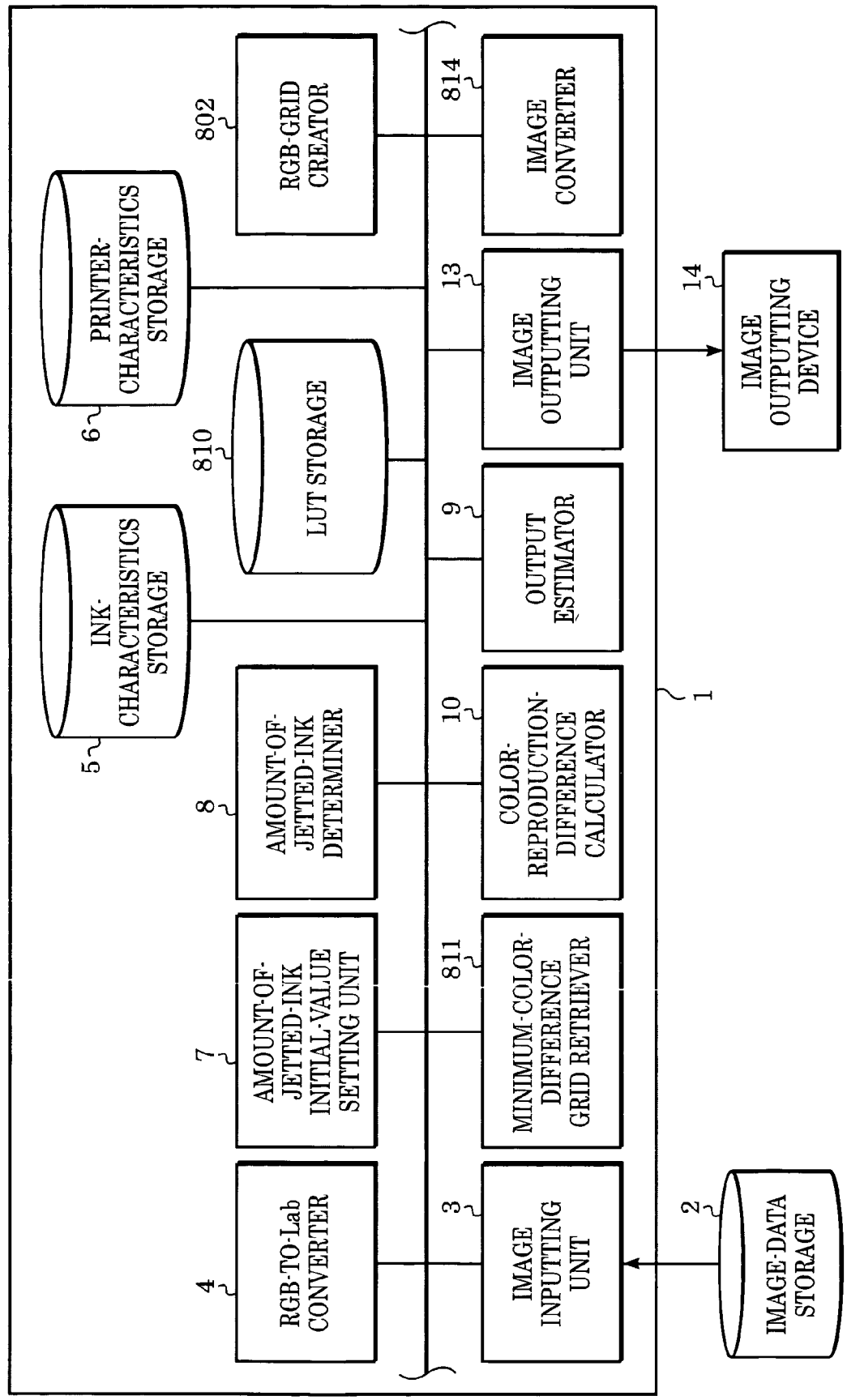
FIG. 8 is a block diagram showing a structure example of a color separation device according to a second embodiment of the present invention.

FIG. 8 is a block diagram showing a structure example of a color separation device 1 of the second embodiment.

The structure in FIG. 8 differs from that in FIG. 1 in that the color separation device 1 has an RGB-grid creator 802 for creating RGB grids (grid space) at equal intervals, corresponding to a color space of input images; an LUT storage 810 for storing the RGB grids and color separation results; a minimum-color-difference grid retriever 811 for retrieving a grid having the smallest color difference from a target pixel from among grids that have already undergone color separation; and an image converter 814 for converting the RGB value of the input image into an amount of jetted ink by using an LUT for color separation stored in the LUT storage 810.

Processing

Figure 9:
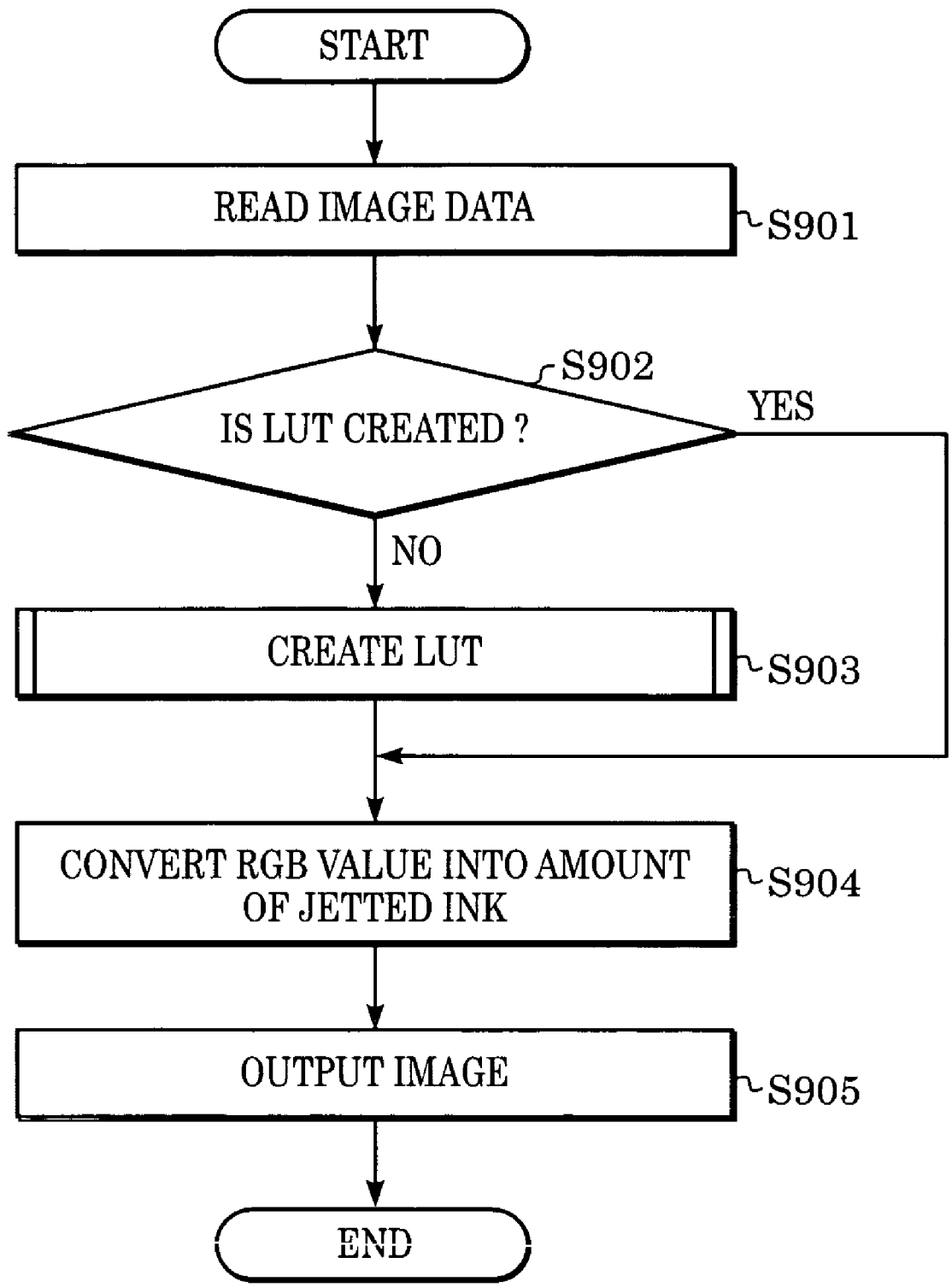
FIG. 9 is a flowchart illustrating the image processing in the color separation device of the second embodiment.

FIG. 9 is a flowchart illustrating the image processing in the color separation device 1 of the second embodiment.

In Step S901, the image inputting unit 3 reads RGB image data stored in the image-data storage 2. In Step S902, the RGB-grid creator 802 determines whether an LUT is created. If an LUT is not created, in Step S903, the color separation device 1 creates an LUT and stores it in the LUT storage 810, as is described in more detail below.

In Step S904, the image converter 814 converts the RGB value of each pixel in the input image data into an amount of jetted ink by using an LUT for color separation stored in the LUT storage 810 and by using, for example, a tetrahedral interpolation method. In Step S905, the image outputting unit 13 outputs the data converted from the RGB value into the amount of jetted ink to the image outputting device 14.

Creating LUT

Figure 10:
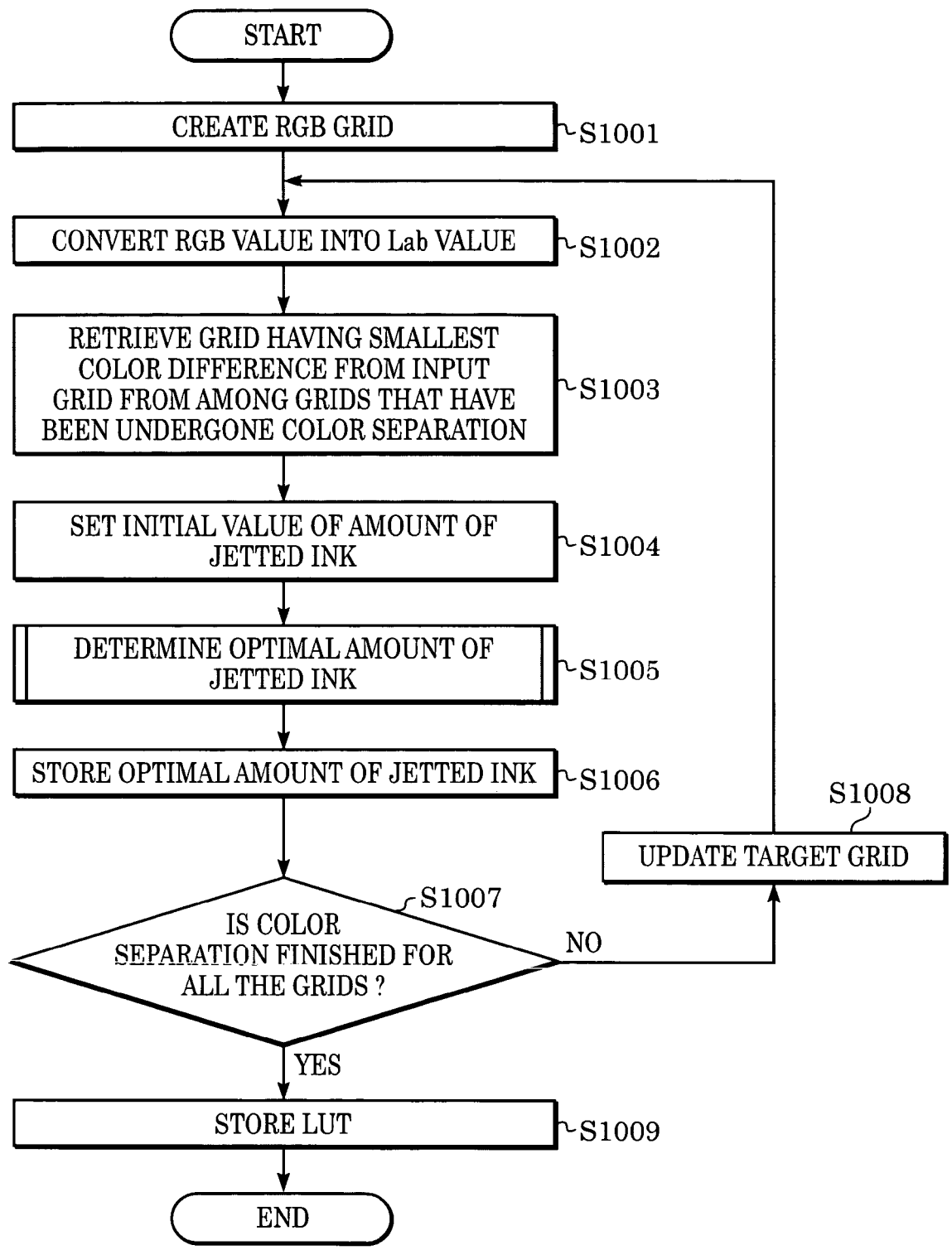
FIG. 10 is a flowchart showing a step of creating an LUT according to the second embodiment.

FIG. 10 is a flowchart showing the step of creating an LUT (Step S903).

In Step S1001, the RGB-grid creator 802 creates RGB grids at equal intervals. In Step S1002, the RGB-to-Lab converter 4 converts the RGB value of one of the created RGB grids (target grid) into a Lab value. If the color gamut of the input image is different from the color gamut of the image outputting device 14, the color-gamut compression is performed, as in the first embodiment.

In Step S1003, the minimum-color-difference grid retriever 811 retrieves a grid having the smallest color difference from the target grid from among grids that have already undergone color separation. In Step S1004, the amount-of-jetted ink initial-value setting unit 7 sets the amount of jetted ink of the retrieved grid as the initial value of the amount of jetted ink of the target grid, as in the first embodiment.

In Step S1005, the amount-of-jetted ink determiner 8 determines an optimal amount of jetted ink, as in the first embodiment. In Step S1006, the LUT storage 810 stores the Lab value converted in Step S1002 and the determined optimal amount of jetted ink.

In Step S1007, the color separation device 1 determines whether the color separation is finished for all the grids. If the color separation is finished for all the grids, in Step S1009, the LUT storage 810 stores the relationship between the created RGB grids and the amount of jetted ink as the LUT for color separation. If the color separation is not finished for all the grids, the color separation device 1 updates the target grid in Step S1008 and returns the processing to Step S1002.

Although the LUT may be created in the output of images, the LUT may also be created in advance at a printer manufacturer in the manner described above and the created LUT may be stored in the LUT storage 810, without creating the LUT each time images are output, because an image outputting device, such as a printer, can use the same LUT every time as long as the same medium including ink or paper is used. In this case, a combination of ink, paper, and so on is selected by a user interface (not shown), and the LUT that corresponds to the selected combination and is stored in the LUT storage 810 is used for color separation.

As described above, according to the second embodiment, in order to determine the amount of jetted ink of an RGB grid, a grid having the smallest color difference is retrieved from among the grids that have undergone color separation (reference grids), and a color reproduction difference is calculated using the amount of jetted ink of the retrieved grid as the initial value. An amount of jetted ink having the smallest color reproduction difference is determined by comparing the calculated color reproduction difference with the color reproduction differences for the amount of jetted ink of the neighborhood points. The LUT for color separation, representing the relationship between the RGB grid and the determined amount of jetted ink, is used to separate the colors of the input image. Accordingly, even without outputting a large number of sample patches and measuring the colors of the sample patches to create the LUT for color separation, color separation results having inhibited noise or pseudo outlines can be attained for printing with ink having five colors or more including at least one special color in addition to CMYK colors. Hence, it is possible to provide output images with a high quality.

When ink or a medium used for the printing is determined, it is sufficient to create the LUT for color separation only once. The color separation can be performed in a short period of time to attain color separation results having inhibited noise or pseudo outlines, thus providing output images with a high quality.

Third Embodiment

Image processing according to a third embodiment of the present invention will now be described. The same reference numerals are used in the third embodiment to identify substantially the same components as in the first and second embodiments. Detailed description of such components is omitted here.

Structure

Figure 11:
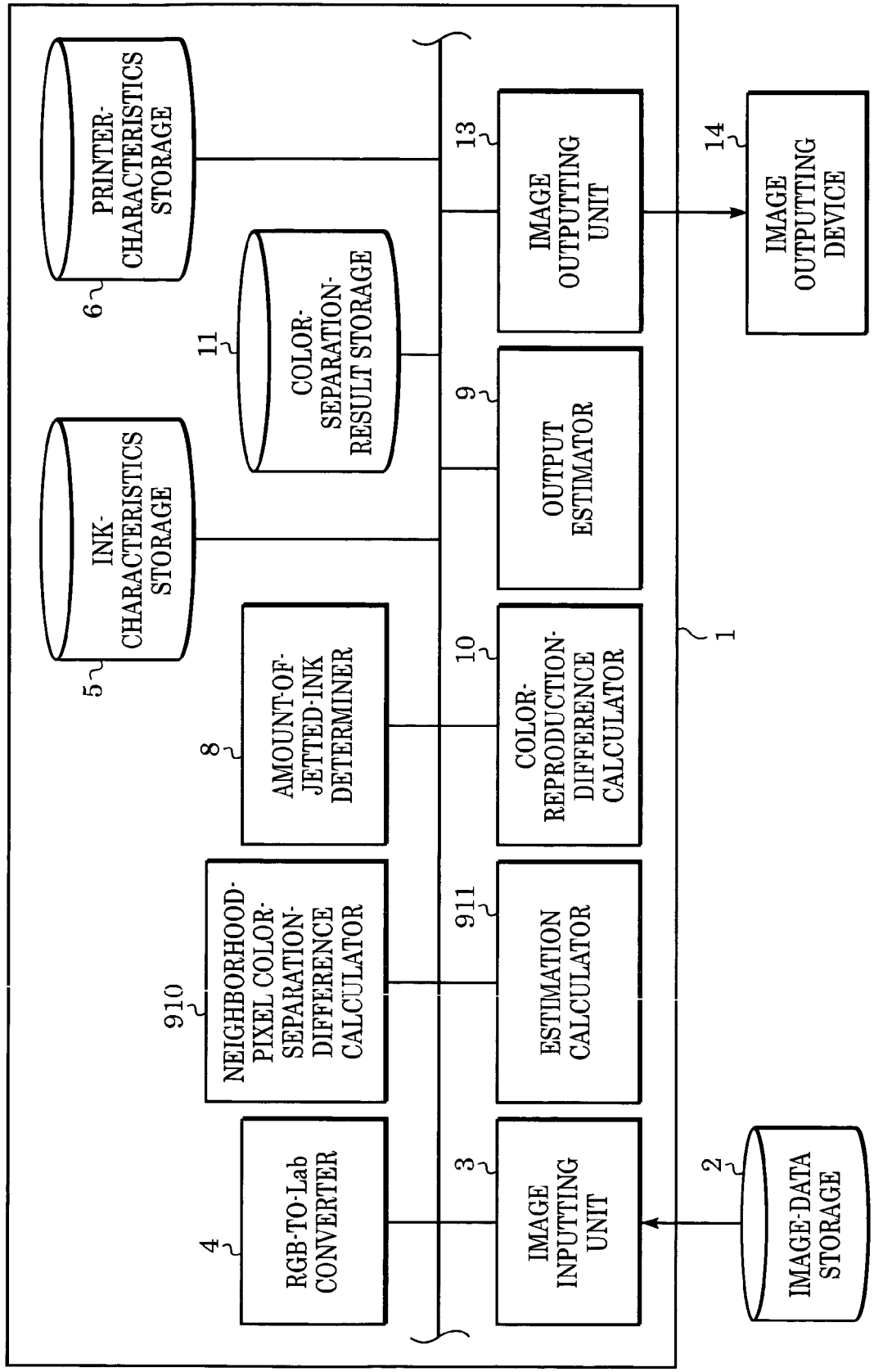
FIG. 11 is a block diagram showing a structure example of a color separation device according to a third embodiment of the present invention.

FIG. 11 is a block diagram showing a structure example of a color separation device 1 of the third embodiment.

The structure in FIG. 11 differs from that in FIG. 1 in that the color separation device 1 has a neighborhood-pixel color-separation-difference calculator 910 for calculating differences between the color separation result of a target pixel and the color separation results of neighborhood pixels that have undergone color separation and an estimation calculator 911 for calculating an estimation from the color reproduction difference calculated by the color-reproduction-difference calculator 10 and the color separation differences of the neighborhood pixels calculated by the neighborhood-pixel color-separation-difference calculator 910.

Processing

Figure 12:
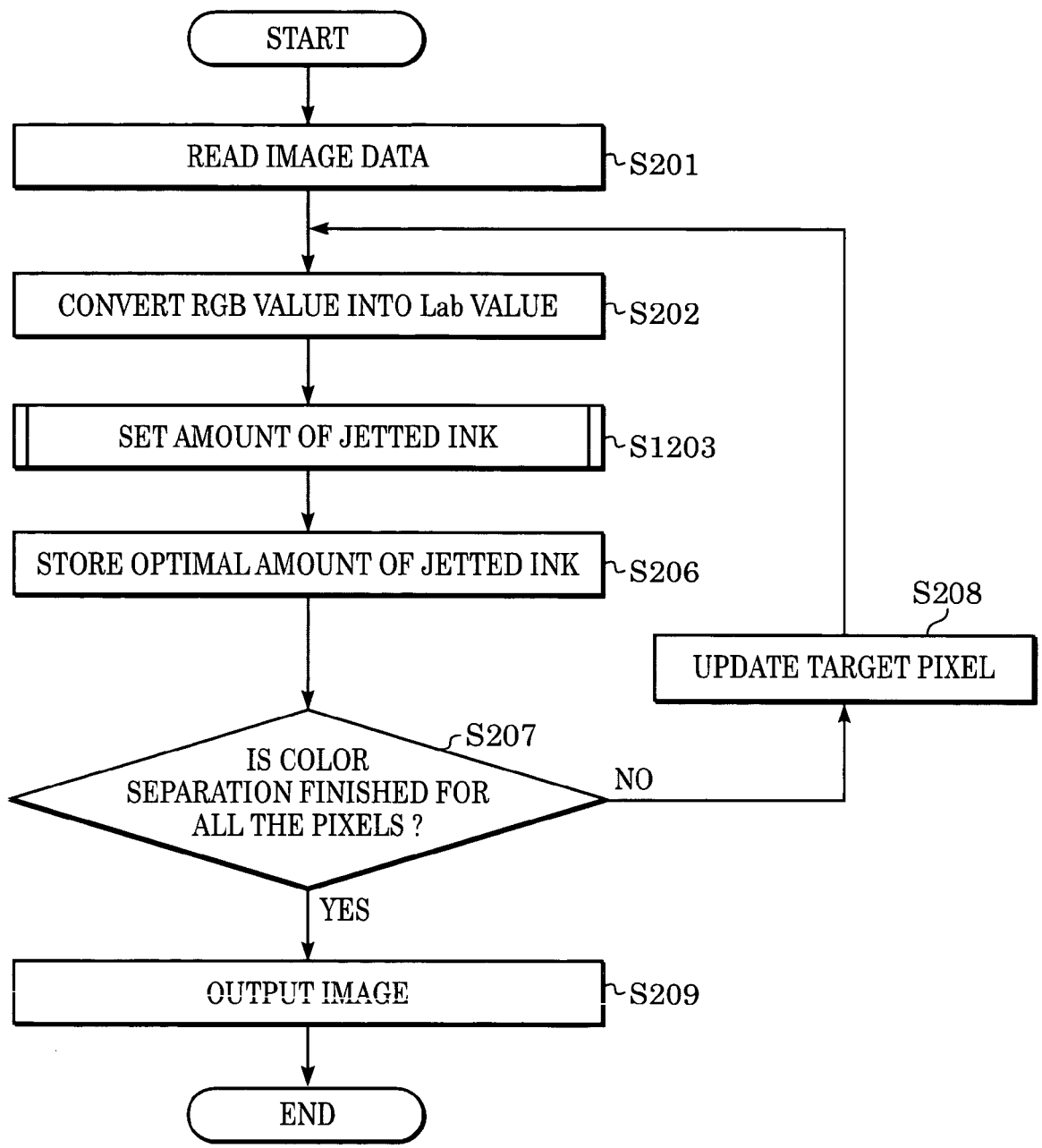
FIG. 12 is a flowchart illustrating the image processing in the color separation device of the third embodiment.

FIG. 12 is a flowchart illustrating the image processing in the color separation device 1 of the third embodiment.

In Step S201, the image inputting unit 3 reads RGB image data stored in the image-data storage 2. In Step S202, the RGB-to-Lab converter 4 converts the RGB value of a target pixel in the input image data into a Lab value by using, for example, an ICC profile. However, the color-gamut compression is performed as required, as described above.

In Step S1203, the color separation device 1 sets an amount of jetted ink for each pixel in the input image, as is described in more detail below. In Step S206, the color-separation-result storage 11 stores the Lab value of the target pixel and the amount of jetted ink set in Step S1203.

In Step S207, the color separation device 1 determines whether the color separation is finished for all the pixels in the input image data. If the color separation is finished for all the pixels, in Step S209, the image outputting unit 13 outputs the image data of the color separation result stored in the color-separation-result storage 11 to the image outputting device 14 to form an image. If the color separation is not finished for all the pixels, the color separation device 1 updates the target pixel in Step S208 and returns the processing to Step S202.

Determining Amount of Jetted ink

The step of setting an amount of jetted ink (S1203) will now be described in detail.

As described above with reference to FIG. 3A, since an amount of jetted ink has a nonlinear relationship with a reproduction color obtained by color mixture of ink when the color reproduction is performed with a printer, the optimization of the amount of jetted ink is required to determine an optimal amount of jetted ink. Consequently, instead of setting the amount of jetted ink by using only the information concerning a target pixel, allowing for the color separation results of neighborhood pixels that have already undergone the color separation and performing the optimization by using the difference between the color separation result of the target pixel and the color separation result of a pixel having an approximate input RGB value as an estimation function produces an optimization result of an approximate amount of jetted ink, as shown in FIG. 3B.

Figure 13:
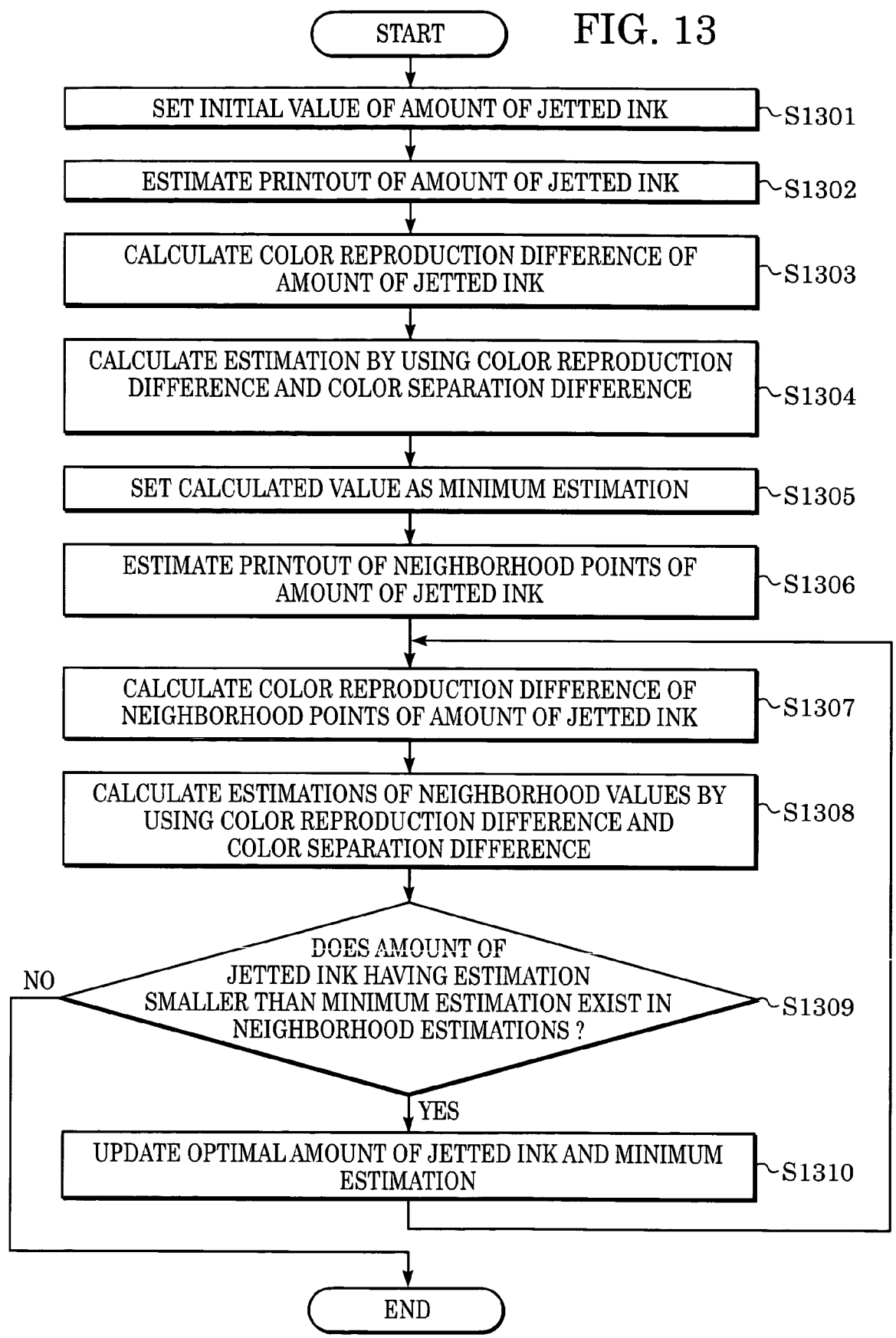
FIG. 13 is a flowchart showing a step of setting an amount of jetted ink according to the third embodiment.

FIG. 13 is a flowchart showing the step of setting an amount of jetted ink (S1203).

In Step S1301, the color separation device 1 sets the initial value of the amount of jetted ink set by the amount-of-jetted ink determiner 8 as an amount of jetted ink. In Step S1302, the output estimator 9 estimates a printout. In Step S1303, the color-reproduction-difference calculator 10 calculates a color difference between the Lab value of a target pixel and the Lab value of the estimated printout to provide a color reproduction difference.

In Step S1304, the neighborhood-pixel color-separation-difference calculator 910 calculates a color separation difference between the target pixel and a neighborhood pixel, as is described in more detail below, and calculates an estimation by using the calculated color separation difference and the color reproduction difference calculated in Step S1303. In Step S1305, the color separation device 1 sets the calculated estimation as the minimum estimation.

In Step S1306, the amount-of-jetted ink determiner 8 sets the amount of jetted ink of neighborhood points of the amount of jetted ink set in Step S1301 (for example, 12 neighborhood points described above), and the output estimator 9 estimates printouts for the amount of jetted ink of the 12 neighborhood points. In Step S1307, the color-reproduction-difference calculator 10 calculates color reproduction differences of the printouts estimated in Step S1306.

In Step S1308, the color separation device 1 calculates estimations of the amount of jetted ink of the 12 neighborhood points, as in Step S1304. In Step S1309, the color separation device 1 determines whether an amount of jetted ink having an estimation smaller than the minimum estimation exists in the amount of jetted ink of the 12 neighborhood points. If an amount of jetted ink having an estimation smaller than the minimum estimation exists, in Step S1310, the color separation device 1 updates the amount of jetted ink of the target pixel with the amount of jetted ink providing the minimum estimation, and updates the minimum estimation with the determined estimation. The color separation device 1 then returns the processing to Step S1307. If an amount of jetted ink having an estimation smaller than the minimum estimation does not exist in Step S1309, the color separation device 1 terminates the processing.

Calculating Color Separation Difference

The calculation of a color separation difference performed in, for example, in Step 1304 will now be described in detail.

Figure 14:
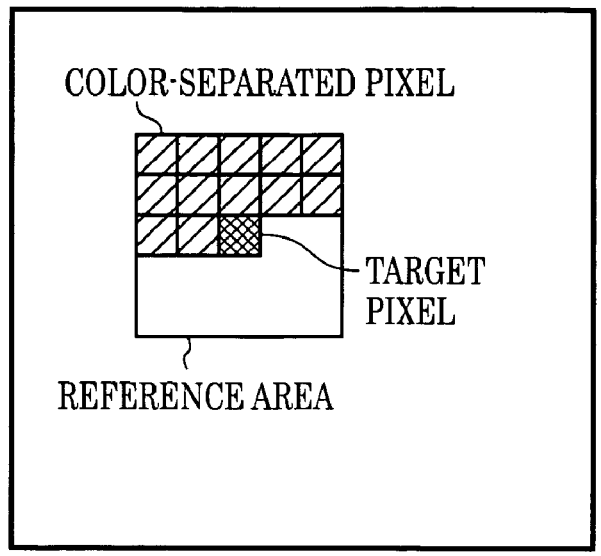
FIG. 14 illustrates a reference area.

Pixels having approximate RGB values in the input image should have approximate color separation results after optimal color separation has been performed. Accordingly, in the color separation of a pixel, a reference area is provided around the target pixel, as shown in FIG. 14, and a color difference in the input image between the target pixel and a reference pixel that has already undergone the color separation in the reference area is calculated. Multiplying the difference in the amount of jetted ink between the target pixel and the reference pixel by a weight determined from the calculated color difference produces a color separation difference between the target pixel and the reference pixel.

Figure 15:
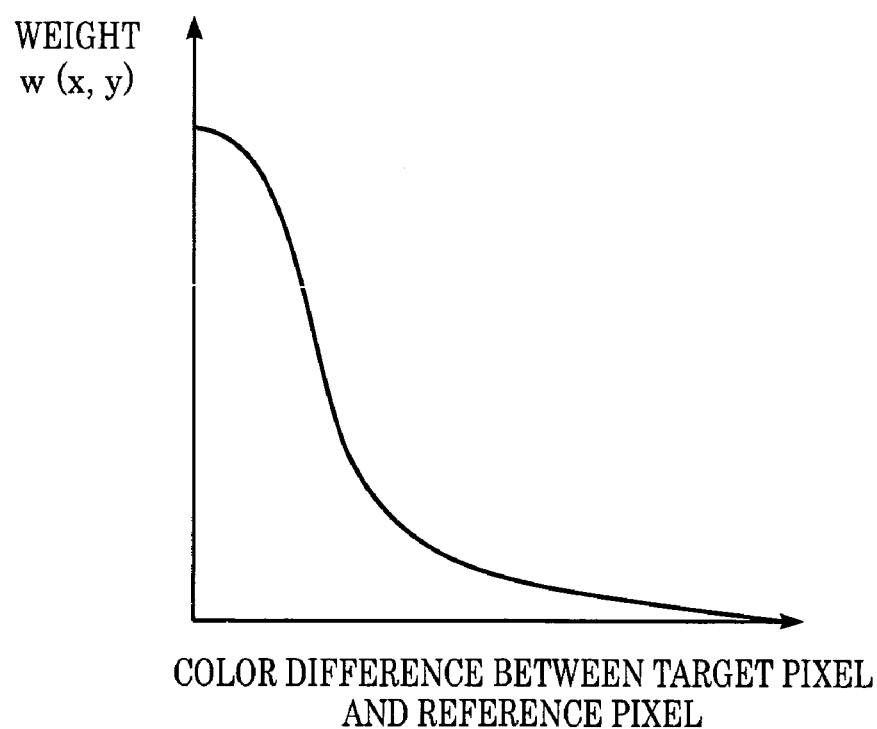
FIG. 15 is a diagram illustrating a weighting function.

In other words, the color separation difference is decreased as the difference between the color separation result of the target pixel and that of a pixel that is close to the target pixel and that has an RGB value approximate to the RGB value of the target pixel in the input image is narrowed. The form of a weighting function used here (the relationship between the color difference of the target pixel from the reference pixel and the weight w(x, y)) is not particularly specified as long as it is a decreasing function, as shown in FIG. 15.

Calculating Estimation

In typical color separation, an amount of jetted ink is determined such that the color difference between a Lab value converted from the RGB value of the input image by using, for example, an ICC profile and a Lab value of the estimated printout is minimized. Namely, the color separation is optimized by using the following equation as the estimation function.

[Formula 2]

$$\text{Estimation} = \sqrt{\{(L_{in}-L_{out})^2+(a_{in}-a_{out})^2+(b_{in}-b_{out})^2\}} \quad (2)$$

where $L_{in}$, $a_{in}$, and $b_{in}$ denote Lab values of the input pixels and $L_{out}$, $a_{out}$, and $b_{out}$ denote Lab values of the printouts.

According to the third embodiment, not only the color difference but also a weighted average of the color separation differences calculated between the target pixel and reference pixels around the target pixel are used as the estimation functions. As a result, an estimation function (equation (2)) causing pixels having approximate RGB values in the input image to have approximate color separation results can be formulated.

[Formula 3]

$$\text{Estimation} = \sqrt{\{(L_{in}-L_{out})^2+(a_{in}-a_{out})^2+(b_{in}-b_{out})^2\}} + \alpha \quad (3)$$

where $$\alpha = \Sigma[w(x,y)\sqrt{\{\Sigma_{k=1}^{n}(in_{k,out}-in_{k,ref})^2/n\}}],$$

w(x, y) denotes a weighting function calculated from the color difference between the target pixel and the reference pixel in the input image, $in_{k,out}$ denotes the k-th value of the amount of jetted ink of the target pixel, and $in_{k,ref}$ denotes the k-th value of the amount of jetted ink of the reference pixel.

As described above, according to the third embodiment, in order to determine the amount of jetted ink of a pixel, a color reproduction difference and a color separation difference are calculated using the amount of jetted ink as the initial value, and an estimation is calculated from the color reproduction difference and the color separation difference. Estimations of the neighborhood points of the amount of jetted ink are also calculated. An amount of jetted ink providing the minimum estimation is determined by comparing the calculated estimations. Accordingly, even without outputting a large number of sample patches and measuring the colors of the sample patches to create the printer characteristics (LUT), color separation results having inhibited noise or pseudo outlines can be attained for printing with ink having five colors or more including at least one special color in addition to CMYK colors. Hence, it is possible to provide output images with a high quality.

Fourth Embodiment

Image processing according to a fourth embodiment of the present invention will now be described. The same reference numerals are used in the fourth embodiment to identify substantially the same components as in the first to third embodiments. Detailed description of such components is omitted here.

Structure

Figure 16:
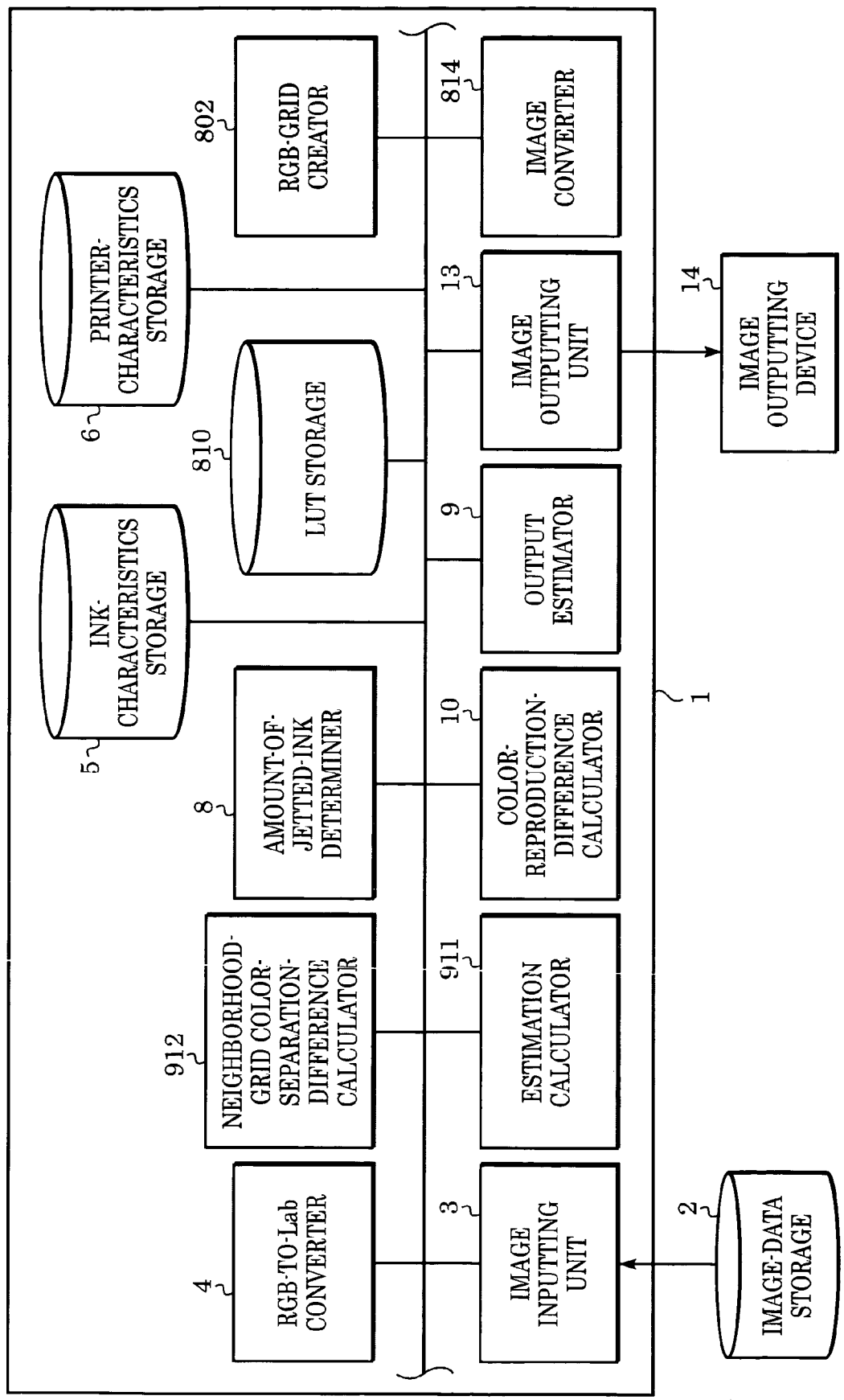
FIG. 16 is a block diagram showing a structure example of a color separation device according to a fourth embodiment of the present invention.

FIG. 16 is a block diagram showing a structure example of a color separation device 1 of the fourth embodiment.

The structure in FIG. 16 differs from that in the second embodiment shown in FIG. 8 and that in the third embodiment shown in FIG. 11 in that the color separation device 1 has a neighborhood-grid color-separation-difference calculator 912 for calculating the differences between the color separation result of a target grid and the color separation results of neighborhood grids that have already undergone color separation.

Creating LUT

Overall image processing with the color separation device 1 of the fourth embodiment is similar to that in the second embodiment described with reference to FIG. 9. However, since the step of creating an LUT (S903) described in detail with reference to FIG. 10 is different from the corresponding step shown in FIG. 17, this step will now be described. In the fourth embodiment, when an estimation of the color reproduction of a grid is to be determined, grids in the neighborhood of the grid are used as reference grids.

Figure 17:
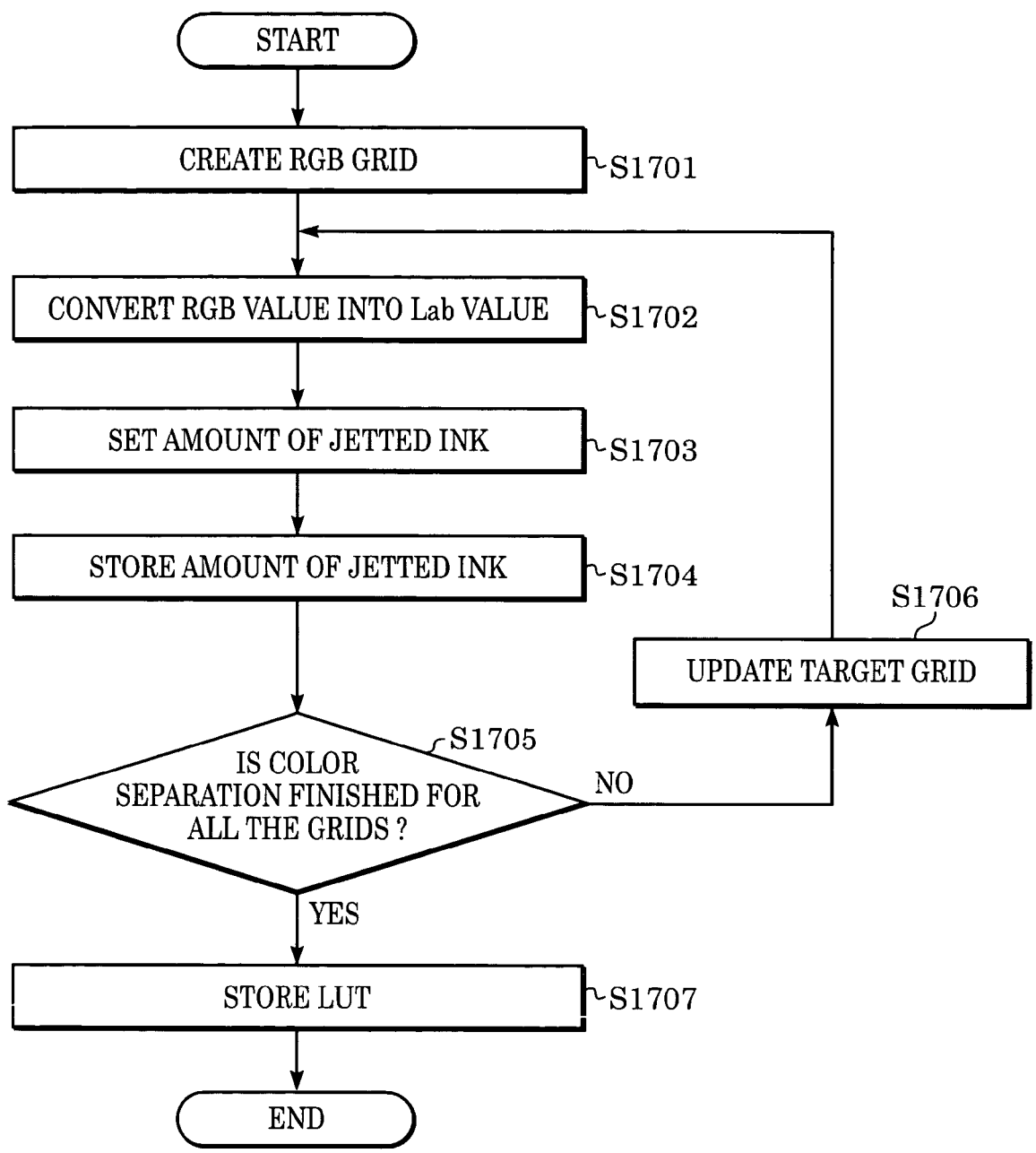
FIG. 17 is a flowchart showing a step of creating an LUT according to the fourth embodiment.

FIG. 17 is a flowchart showing the step of creating an LUT (S903).

In step S1701, the RGB-grid creator 802 creates RGB grids at equal intervals. In Step S1702, the RGB-to-Lab converter 4 converts the RGB value of one of the created RGB grids (target grid) into a Lab value. If the color gamut of the input image is different from that of the image outputting device 14, the color-gamut compression is performed, as in the first embodiment.

In Step S1703, the color separation device 1 sets an amount of jetted ink, as in the third embodiment. In Step S1704, the LUT storage 810 stores the Lab value converted in Step S1702 and the amount of jetted ink set in Step S1703.

In Step S1705, the color separation device 1 determines whether the color separation is finished for all the grids. If the color separation is finished for all the grids, in Step S1707, the LUT storage 810 stores the relationship between the created RGB grids and the amount of jetted ink as the LUT for color separation. If the color separation is not finished for all the grids, the color separation device 1 updates the target grid in Step S1706 and returns the processing to Step S1702.

Although the LUT may be created in the output of images, as in the second embodiment, the LUT may also be created in advance at a printer manufacturer in the manner described above and the created LUT may be stored in the LUT storage 810, without creating the LUT each time images are output, because an image outputting device, such as a printer, can use the same LUT every time as long as the same medium including ink or paper is used. In this case, a combination of ink, paper, and so on is selected by a user interface (not shown), and the LUT that corresponds to the selected combination and is stored in the LUT storage 810 is used for color separation.

As described above, according to the fourth embodiment, in order to determine the amount of jetted ink of an RGB grid, a color reproduction difference and a color separation difference are calculated using the amount of jetted ink as the initial value, as in the third embodiment, and an estimation is calculated from the color reproduction difference and the color separation difference. Estimations of neighborhood points of the amount of jetted ink are also calculated. An amount of jetted ink providing the minimum estimation is determined by comparing the calculated estimations. The LUT for color separation, representing the relationship between the RGB grid and the determined amount of jetted ink, is used to separate the colors of the input image. Accordingly, even without outputting a large number of sample patches and measuring the colors of the sample patches to create the LUT for color separation, color separation results having inhibited noise or pseudo outlines can be attained for printing with ink having five colors or more including at least one special color in addition to CMYK colors. Hence, it is possible to provide output images with a high quality.

When ink or a medium used for the printing is determined, it is sufficient to create the LUT for color separation only once, as in the second embodiment. The color separation can be performed in a short period of time to attain color separation results having inhibited noise or pseudo outlines, thus providing output images with a high quality.

Modifications

Although the RGB-format input image data is exemplified in the first to fourth embodiments, for example, a spectral image (each pixel in an image is represented by the reflectance of each wavelength sampled at intervals of 10 nm within a visible wavelength band ranging from 380 nm to 780 nm) may be used. In this case, the spectral reflectances, instead of the Lab values, are measured and stored for all the sample patches for measuring the ink characteristics or the printer characteristics. Root mean square error of the spectral reflectances of the wavelengths may be used as the color reproduction difference.

Other Embodiments

The present invention may be applied to a system including a plurality of devices (for example, a host computer, an interface device, a reader, and a printer) or to an apparatus including one device (for example, a copying machine or a facsimile machine).

The object of the present invention can also be accomplished by providing a storage medium (or recording medium) for storing program code of software that realizes the functions of the above embodiments in a system or in an apparatus, the computer (or the CPU or the MPU) of which reads out and executes the program code stored in the storage medium. In this case, the program code itself read out from the storage medium realizes the functions of the embodiments described above. The storage medium having the program code stored therein constitutes the present invention. The computer that executes the read program code realizes the functions of the embodiment described above. In addition, the operating system (OS) or the like run on the computer may execute all or part of the actual processing based on the instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on the instructions in the program code to realize the functions of the embodiments described above.

When the present invention is applied to the above storage medium, program code corresponding to the flowcharts described above is stored in the storage medium.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

What is claimed is:

1. An image processing method of creating a lookup table having a plurality of grids and performing a color conversion processing in accordance with characteristics of an output device, the image processing method comprising the steps of:

setting the grids constituting the lookup table;

selecting a target grid from the set grids;

selecting a grid having a small difference from the target grid from among grids whose output values are calculated;

setting an output value of the selected grid as an initial value;

estimating an output value of the target grid by using the set initial value; and storing the estimated output value as an output value of the target grid, wherein the estimation is repeated in accordance with an estimation based on a difference between a result of the estimation and the target grid.

2. The image processing method according to claim 1, wherein a calculation is repeated in the estimating step, and wherein the estimating step includes the steps of:

setting the initial value as an optimal value;

calculating a difference between an output value in the neighborhood of the optimal value and the output value of the target grid; and comparing the calculated difference with the difference from the optimal value and, if the calculated difference is smaller than the difference from the optimal value, updating the optimal value with the neighborhood value.

3. The image processing method according to claim 1, wherein the lookup table converts an input value into a color-material value and has a plurality of pairs of the color-material value and a color-measurement value, and wherein the image processing method performs the estimation by using the plurality of pairs.

4. A storage medium having stored thereon a program enabling a computer to realize the image processing method according to claim 1.

5. An image processing apparatus for creating a lookup table having a plurality of rids and performing color conversion processing in accordance with characteristics of an output device, the image processing apparatus comprising:

a grid setting unit adapted to set the grids constituting the lookup table;

a target grid selecting unit adapted to select a target grid from the set grids;

a grid selecting unit adapted to select a grid having a small difference from the target grid from among grids whose output values are calculated;

an output value setting unit adapted to set an output value of the selected grid as an initial value;

an estimating unit adapted to estimate an output value of the target grid by using the set initial value; and a storing unit adapted to store the estimated output value as an output value of the target grid, wherein the estimation is repeated in accordance with an estimation based on a difference between a result of the estimation and the target grid.

* * * * *